(12) United States Patent
Delpy et al.

(10) Patent No.: US 12,152,945 B2
(45) Date of Patent: Nov. 26, 2024

(54) TEMPERATURE SENSOR FOR USE IN RUBBER MIXERS

(71) Applicant: COMPAGNIE GENERALE DES ETABLISSEMENTS MICHELIN, Clermont-Ferrand (FR)

(72) Inventors: Jean-Pierre Delpy, Clermont-Ferrand (FR); Maxime Regnault, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 428 days.

(21) Appl. No.: 17/616,344

(22) PCT Filed: Jun. 3, 2020

(86) PCT No.: PCT/EP2020/065326
§ 371 (c)(1),
(2) Date: Dec. 3, 2021

(87) PCT Pub. No.: WO2020/245181
PCT Pub. Date: Dec. 10, 2020

(65) Prior Publication Data
US 2022/0326093 A1    Oct. 13, 2022

(30) Foreign Application Priority Data
Jun. 5, 2019 (FR) ........................... 1905934

(51) Int. Cl.
*G01K 7/04* (2006.01)
*B29B 7/18* (2006.01)
(Continued)

(52) U.S. Cl.
CPC ............... *G01K 7/04* (2013.01); *B29B 7/183* (2013.01); *B29B 7/286* (2013.01); *G01K 1/08* (2013.01); *G01K 1/14* (2013.01)

(58) Field of Classification Search
CPC .. G01K 1/08; G01K 1/14; G01K 7/02; G01K 13/02; B29B 7/183; B29B 7/286
See application file for complete search history.

(56) References Cited

U.S. PATENT DOCUMENTS 3,301,715 A * 1/1967 Gerrard .................... G01K 1/12
374/E1.016
4,989,992 A    2/1991 Piai
(Continued)

FOREIGN PATENT DOCUMENTS

CN    203 385 487 U    1/2014
CN    206 056 804 U    3/2017
(Continued)

OTHER PUBLICATIONS

International Search Report dated Aug. 19, 2020, in corresponding PCT/EP2020/065326 (2 pages).

*Primary Examiner* — Mirellys Jagan
(74) *Attorney, Agent, or Firm* — VENABLE LLP

(57) ABSTRACT

A temperature sensor (10) for measuring a temperature of a mixture being mixed in an internal mixer includes a fixed part having a substantially cylindrical body (12) and a removable part (16) of domed shape arranged inside a conduit of the body. The temperature sensor also includes a blowing stem (14) in communication with a source of compressed air that extends along a conduit (12c) of the body and terminates at an outlet end (14a) disposed in the removable portion (16), whereby the compressed air exits the blowing stem (14) and passes uninterruptedly through a temperature measuring element or elements at a contact end (16b) of the removable portion. A combination of an internal (Continued)

mixer and a temperature sensor for measuring a temperature of a mixture being mixed in the internal mixer is also disclosed.

10 Claims, 2 Drawing Sheets

(51) Int. Cl.
  *B29B 7/28* (2006.01)
  *G01K 1/08* (2021.01)
  *G01K 1/14* (2021.01)

(56) References Cited

U.S. PATENT DOCUMENTS

| | | | |
|---|---|---|---|
| 5,139,345 A | | 8/1992 | Schafer et al. |
| 2014/0376593 A1 | * | 12/2014 | Ewing .................... G01K 1/20 |
| | | | 374/179 |
| 2017/0030779 A1 | | 2/2017 | Rudkin |

FOREIGN PATENT DOCUMENTS

| | | | | |
|---|---|---|---|---|
| DE | 1935219 U | | 3/1966 | |
| DE | 19703932 A1 | * | 8/1998 | ............... G01K 7/02 |
| IT | 1227708 B | | 5/1991 | |
| JP | 2000-111412 A | | 4/2000 | |
| JP | 2004-141733 A | | 5/2004 | |
| JP | 2012-21817 A | | 2/2012 | |
| WO | WO-2019000402 A1 | * | 1/2019 | ............. B22D 2/006 |

\* cited by examiner

TEMPERATURE SENSOR FOR USE IN RUBBER MIXERS

TECHNICAL FIELD

The invention relates generally to the production of rubber mixtures and the mixers used. More particularly, the invention relates to a temperature sensor for measuring the temperature in an internal mixer of the Banbury type operating by batch.

BACKGROUND

In the field of rubber mixing, Banbury-type internal mixers operating by batch (and their equivalents) are well known for making rubber mixtures. In these types of mixers, when the materials of a mixture are mixed, a mixture in the process of manufacture is subjected to severe stresses. It is therefore advisable to install a temperature sensor that measures a temperature of a high viscosity mixing material that is mixed by rotating the mixing rotor in mixing chambers. On the basis of the temperature measurement, the expected mixing qualities at the end of the cycle of the internal mixer can be validated (for example, values of temperature of a mixture at the time when the mixture is discharged and at the time when a new mixing cycle starts). It is understood that "temperature measurement", "temperature sensing", "temperature detector" or "temperature sensor" refers to either the measurement of temperature of the mixture being mixed or the measurement of temperature of the materials in the mixture being mixed.

Temperature sensors (or "sensors") have therefore been developed for use in internal mixers. Currently known sensors are multi-part sensors that are permanently joined together by bonding, welding, forming or similar assembly processes to withstand difficult mixing conditions, including, without limitation, abrasive materials, varying temperatures of the materials being mixed, and bending and pressure stresses.

Examples of temperature sensors that allow accurate measurement of the temperature of the mixture can be found in the prior art. Some solutions include assemblies (see, for example, publication DE1935219, which discloses a temperature sensor having several parts, including an insulating body, and U.S. Pat. No. 5,139,345, which discloses a temperature sensor constructed of several materials, including a conductive material, steel and ceramic). Some solutions include thermocouples insulated by one or more jackets to reduce disturbances to the current flowing from the thermocouple (see publications JP2012021817, JP2004141733 and IT8821573).

When these sensors are no longer in working order (for example, due to wear, breakage, unacceptable measurement accuracy or other known problems), the entire sensor must be replaced, while often only the "measurement part" is defective. Furthermore, in the case of successive cycles, due to their inertia, these sensors do not restart from the ambient temperature during the first seconds of mixing, thus giving an inaccurate temperature measurement.

Thus, the invention disclosed herein introduces a temperature sensor (or "sensor") for use in internal mixers, such sensor including a fixed part and a removable part that contains the measuring elements. When it is necessary to replace the removable part, only that part needs to be changed, and the rest of the sensor is conserved. The price of the removable part is lower compared to a complete sensor, so an economic benefit is achieved. The changes are therefore less expensive with the sensor of the invention, and after a few changes of the sensor, the financial investment is reduced.

The disclosed invention also introduces a temperature sensor for use in internal mixers that incorporates a compressed air blowing system. Such a system makes it possible to very quickly cool the removable part of the sensor containing the measuring elements.

SUMMARY OF THE INVENTION

The invention relates to a temperature sensor for measuring a temperature of a mixture being mixed in an internal mixer. The temperature sensor includes a fixed part in the form of a substantially cylindrical body with a predetermined length that extends between a measuring end, where the temperature of the mixture is measured by the sensor, and an access end, and with a conduit delimited inside the body incorporating a face towards the measuring end, the conduit having a length substantially equal to the predefined length of the body. The temperature sensor also includes a removable part disposed inside the conduit of the body towards the measuring end where it abuts the face, the removable part with a predetermined length extending between a clamping end, where the removable part is clamped relative to the fixed part, and a contact end, where the removable part comes into contact with the mixture. The removable part has a defined shoulder at the clamping end that engages the face of the body. The removable part also has a conduit of a predetermined length within the removable part that is defined by the distance between the shoulder and the opposite contact end. The removable part incorporates temperature measuring element(s) disposed within the conduit from the removable part to the contact end. The temperature sensor also includes a blowing stem in communication with a source of compressed air. The blowing stem extends along the conduit of the body from the access end, where the blowing stem enters the body, and terminates at an outlet end disposed in the conduit of the removable part so that compressed air exits the blowing stem and passes uninterruptedly through the temperature measuring element(s) at the contact end.

In some embodiments of the temperature sensor, the temperature measuring element(s) include one or more thermocouple(s).

In some embodiments of the temperature sensor, the removable part further includes a flattened portion defined at the clamping end; and the fixed part includes a needle screw disposed towards the measuring end of the body; whereby tightening the needle screw on the flattened portion prevents rotation of the removable part when the assembly of the removable part and the fixed part is effected.

In some embodiments of the temperature sensor, the blowing stem enters the removable part at the clamping end, where the engagement between the needle screw and the flattened portion prevents rotation of the removable part.

In certain embodiments of the temperature sensor, the temperature sensor further includes a protective tube with a predetermined length that extends between an arrangement end, where the protective tube engages against the shoulder of the removable part, and a screwing end, where the protective tube is held by a part that is screwed with the body and comes to rest on the protective tube in order to retain the removable part in the operational position as soon as the removable part is inserted into the conduit of the body. In some embodiments, the blowing stem is protected by the protection tube to provide an uninterrupted air flow from the source of compressed air to the outlet end of the blowing stem.

In some embodiments of the temperature sensor, a material chosen for the body and the removable part is stainless steel.

In some embodiments of the temperature sensor, the removable part is curved.

The invention also relates to a combination of an internal mixer and a temperature sensor for measuring a temperature of a mixture being mixed in the internal mixer. The combination includes an internal mixer that produces the rubber mixtures and incorporates a ram and two half-chambers, each containing a rotor with one or more blades that rotate in relation to a wall of a corresponding chamber. The combination also includes the disclosed temperature sensor, the temperature sensor being mounted with respect to the mixer in such a way that the contact end of the removable part remains sufficiently free to allow good reactivity in the measurement of temperature while remaining uninfluenced by the bending stresses associated with the mixture.

The invention also relates to a kit including the disclosed temperature sensor, and one or more fixing means adapted for mounting the temperature sensor with respect to a selected internal mixer.

Other aspects of the invention will become apparent from the following detailed description.

BRIEF DESCRIPTION OF THE DRAWINGS

The nature and the various advantages of the invention will become more evident upon reading the following detailed description, together with the attached drawings, in which the same reference numbers designate identical parts everywhere, and in which.

DETAILED DESCRIPTION

Figure 1:
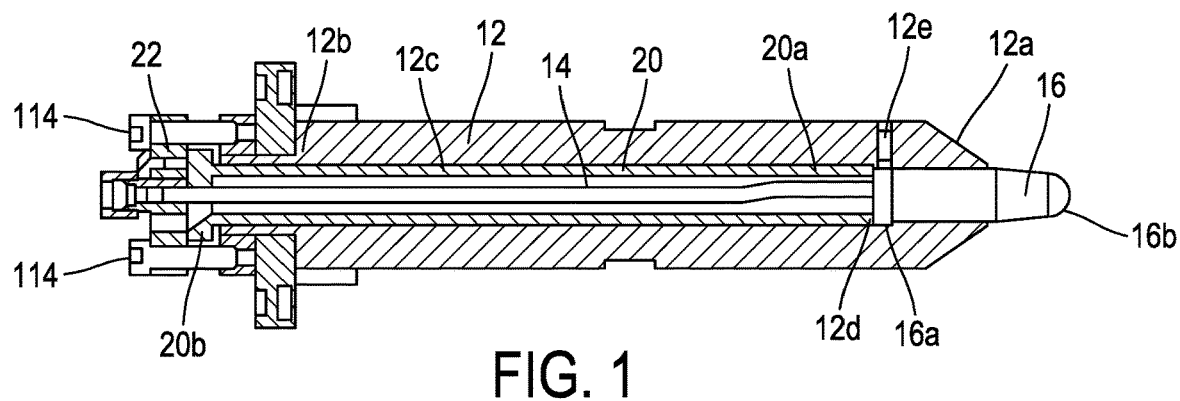
FIG. 1 represents a lateral sectional view of a temperature sensor of the invention.
Figure 2:
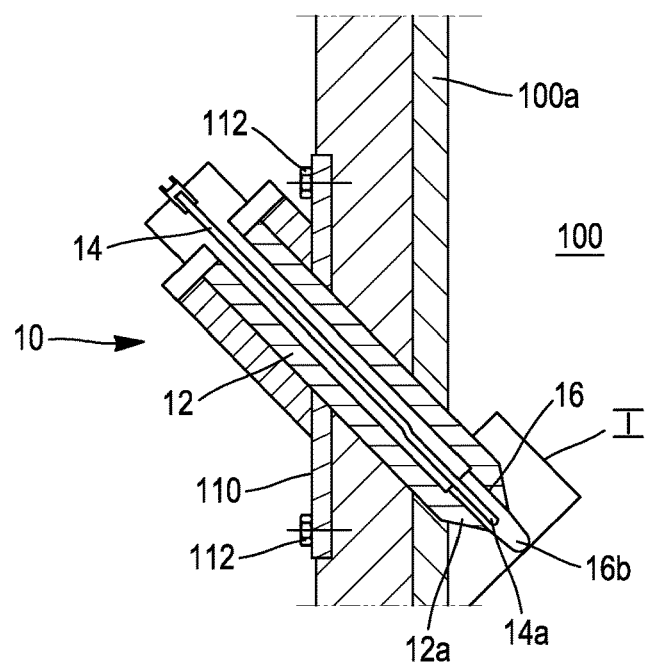
FIG. 2 represents a lateral view, in partial section, of the temperature sensor of FIG. 1 mounted in a chamber of an internal mixer.

Referring now to the figures, in which the same numbers identify identical elements, FIGS. 1 and 2 represent a method of making a temperature sensor (or "sensor") 10 suitable for installation in Banbury type internal mixers (and their equivalents) that are well known for making rubber mixtures. By "internal mixer" (or "mixer" or "MI") is meant a machine consisting of a ram and two half-chambers (or "chambers") 100, each containing a rotor with one or more blades that rotate relative to a wall 100a of a corresponding chamber. The sensor 10 can be mounted either in the 100a wall of the mixer chamber 100 (as shown in FIG. 2) or in an openable seat of the mixer (not shown).

During a mixing cycle carried out by the internal mixer, the different raw materials can be fed into the mixer. The raw materials include the materials necessary to make a product obtained from a mixing cycle, including, without limitation, elastomeric material (for example, natural rubber, synthetic elastomer and combinations and equivalents thereof) and one or more ingredients, such as one or more processing agents, protective agents and reinforcing fillers. The raw materials may also include one or more other ingredients such as carbon black, silica, oils, resins, silanes and cross-linking or curing agents. All of the ingredients are introduced in varying quantities depending on the desired performance of the products obtained from the mixing cycles (for example, tires). The mixing cycle can also be done by starting the cycle with a product that has already been mixed but does not contain all the ingredients of the recipe (called "masterbatch"). For example, resins and curing agents are not present in the masterbatch.

The sensor 10 includes a fixed part in the form of a body 12 that is substantially cylindrical. The body 12 has a predetermined length that extends between a measuring end 12a, where the temperature of the mixture is measured by the sensor, and an access end 12b, where a blowing stem 14 is inserted into the sensor 10. The blowing stem 14 extends into a conduit 12c that is delimited inside the body 12. The length of conduit 12c is defined by the distance between the access end 12b and an opposite face 12d. The length of conduit 12c is approximately equal to the predefined length of the body. The body 12 can be mounted in wall 100a by known fastening means (shown in FIG. 2, for example, by means of flange 110 and screws 112).

Figure 3:
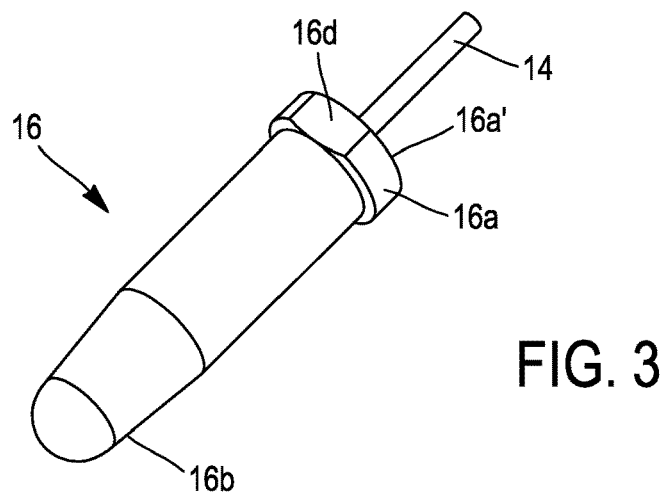
FIG. 3 represents a perspective view of a removable part of the temperature sensor of the invention.
Figure 4:
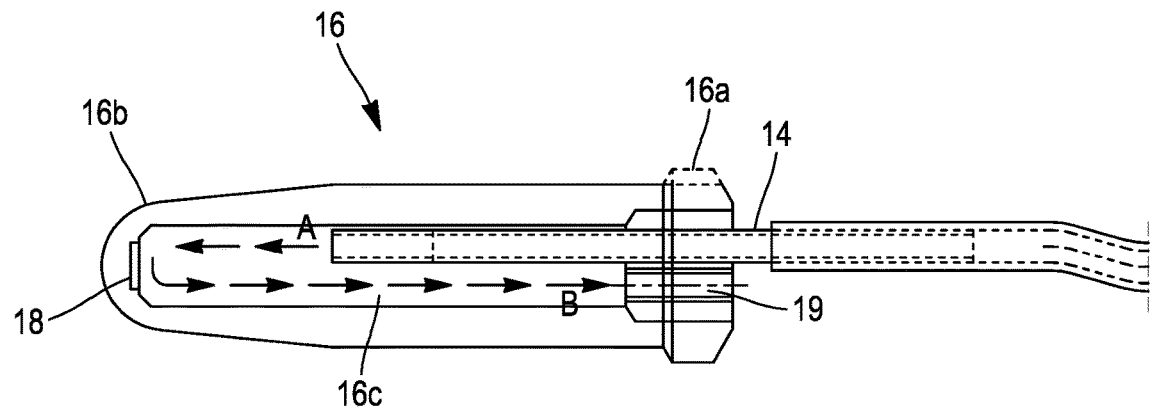
FIG. 4 is a partial cross-sectional side view of the removable part of FIG. 3.

Referring again to FIGS. 1 and 2, and also to FIGS. 3 and 4, the sensor 10 also has a removable part 16 with a domed shape. The removable part 16 is arranged inside the conduit 12c of the body 12 towards the measuring end 12a where it abuts against the face 12d. The removable part 16 has a predetermined length that extends between a clamping end 16a, where the removable part is clamped relative to the fixed part, and a contact end 16b, where the removable part comes into contact with the mixture (which may be raw materials in the course of being mixed). A shoulder 16a' is defined at the clamping end 16a that engages against the 12d face of the body 12. A conduit 16c with a predetermined length is defined inside the removable part 16 (see FIG. 4). The length of conduit 16c is defined by the distance between the shoulder 16a' and the opposite contact end 16b. The conduit 16c of the removable part 16 incorporates an outlet end 14a of the blowing stem 14 and one or more measuring elements of the sensor 10. In the embodiment shown in FIG. 4, the measuring element is represented by a thermocouple 18 disposed in the conduit 16c of the removable part 16 at the contact end 16b. It is understood that the thermocouple 18 can be replaced by other thermocouples or equivalent temperature sensors (for example, by one or more resistance thermometers).

The removable part 16 additionally has a flattened part 16d defined at the clamping end 16a (see FIG. 3). When assembling the removable part 16 to the fixed part, the flattened part 16d is positioned in front of a needle screw 12e of the body 12. The needle screw 12e is positioned towards the measuring end 12a of the body 12 next to the face 12d. In this position, the needle screw 12e ensures that the removable part 16 is in the operational position as soon as the removable part is inserted into the conduit 12c of the body 12.

Referring again to FIG. 1, and also to FIG. 4, in order to quickly cool down the removable part 16 of the sensor 10, the blowing stem 14 enters the body 12 at the access end 12b and extends along the conduit 12c of the body. At the access end 12b, the blowing stem 14 is in communication with a compressed air source (not shown). The blowing stem 14 enters the removable part 16 at the clamping end 16a, where the needle screw 12e of the body 12 is tightened on the flattened part 16d of the removable part 16 to prevent rotation of the removable part. During the blowing of compressed air, this positioning ensures a continuous flow of compressed air along the entire blowing stem. The blowing stem 14 ends at the outlet end 14a from which the compressed air enters conduit 16c of the removable part 16 (see arrow A in FIG. 4). In this configuration, the compressed air follows a path that leads the compressed air to the thermocouple 18 before exiting to the outside of the removable part 16 (for example, through port 19)(see arrows B in FIG. 4). The blowing stem 14 can be in the form of a duct, hose or other known guiding means. Compressed air flowing continuously at the contact end 16b of the thermocouple 18 ensures that the temperature of the sensor is close to that of the raw materials fed to the mixer when a new mixing cycle starts. The first temperature readings are therefore accurate.

The pressure of the compressed air used to cool the sensor 10 (and especially the removable part 16) is adjusted to allow effective cooling between consecutive mixing cycles. In an embodiment pf the sensor 10, this pressure is less than or equal to 3.5 bar.

Referring again to FIG. 1, the sensor 10 includes a protection tube 20 inserted in the conduit 12c of the body 12. During the assembly of the sensor 10, this insertion is carried out after the removable part 16 has been inserted in the conduit 12c of the body 12. The protection tube 20 has a predetermined length that extends between an arrangement end 20a, where the protection tube engages against the shoulder 16a' of the removable part 16, and a screwing end 20b, where the protection tube is held by a part 22. The part 22 is screwed to the body 12 (for example, by the fixing screws 114 shown in FIG. 1), and thus presses against the protection tube 20 to retain the removable part 16 in the operational position. The blowing stem 14 is protected in the protection tube 20 to provide an uninterrupted air flow from the compressed air source, through the access end 12b, along the body 12 and to the outlet end 14a of the blowing stem 14.

Using the disclosed combination of the fixed and removable parts, only the removable part 16 (being the active part of the sensor 10) needs to be changed in case of sensor failure. As a result, a sensor 10 can be made more elaborate, more massive and therefore more rigid so as to withstand multiple mixing cycles without replacement. The sensor 10 is therefore rarely replaced afterwards, saving investment during the operational life of the sensor.

In addition, the sensor 10 itself is more robust since it can withstand mixtures with high viscosity without risk of breakage. Referring to FIG. 2, especially the part designated "I", at least half of the length of the removable part 16 extends from the measuring end 12a of the body 12. The contact end 16b of the removable part 16 remains sufficiently free to allow a good reactivity in the measurement of temperature. The contact end 16b is not very sensitive to bending stresses caused by the mixture. This characteristic facilitates the removal of the removable part 16 in case of damage to the sensor 10 by bending. By way of comparison, in the case of known sensors, it is difficult to remove the deformed part that is just the diameter of the passage in the mixer body. With the disclosed sensor 10, the sensor body 12 is much larger than the removable part 16. Therefore, if the removable part 16 is deformed by bending, there is no associated difficulty in removing this part and replacing it without disturbing the positioning of the body 12. The function and efficiency of the sensor 10 is therefore always assured.

The material used for the body 12 and the removable part 16 is chosen from materials suitable for all of the raw materials and mixtures considered. This material is particularly chosen from a metal of high homogeneity to avoid local corrosion. Such a metal must have good mechanical and chemical resistance and must be vacuum cast to avoid internal defects and the propagation of damage.

In some embodiments, the metal chosen can be a martensitic stainless steel.

The removable part 16 of the sensor 10, being thinner than the body 12, allows a good measuring reactivity almost equivalent to known sensors while being robust because it is protected by the solid body. This characteristic, combined with the cooling of the removable part 16 by the blowing stem 14, allows reliable measurement of the temperature of the mixture from the beginning of a mixing cycle until the mixture is discharged from the mixer. Thus, the sensor 10 measures more accurately the actual temperature of the mixture especially when a new mixing cycle starts.

Figure 5:
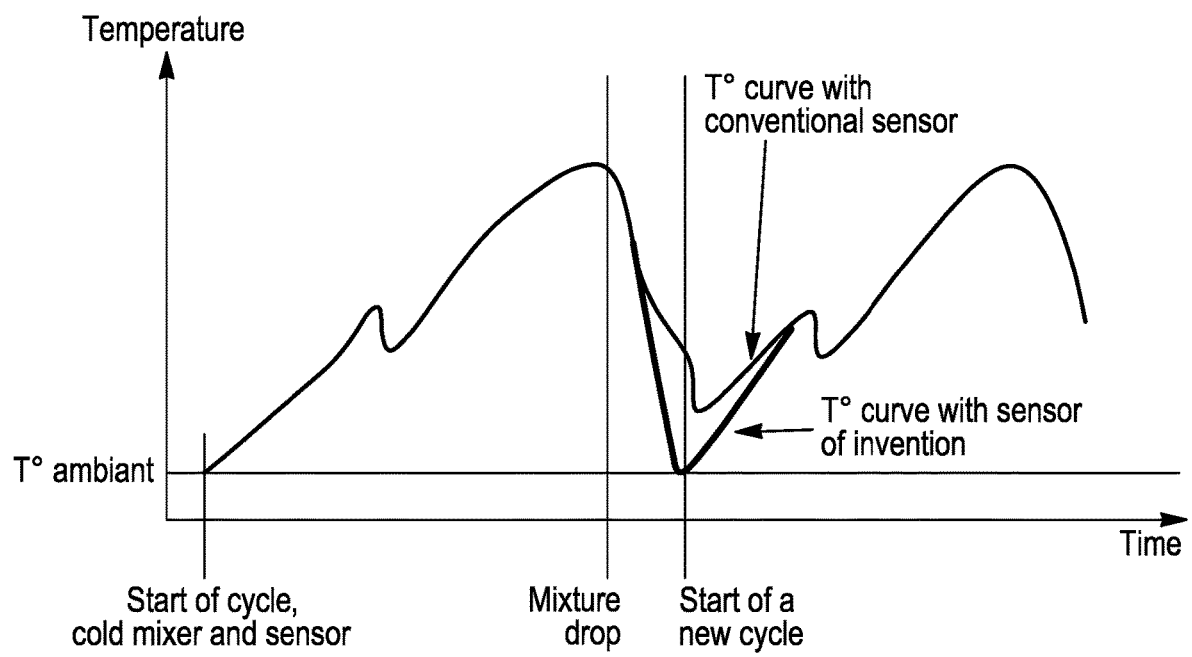
FIG. 5 represents a graph corresponding to a detection of temperature made by the temperature sensor of the invention in relation to an existing temperature sensor.

By way of example, FIG. 5 shows a graph corresponding to a detection of temperature made by the sensor 10 of the invention in relation to an existing temperature sensor (referred to as a "conventional sensor"). By considering the temperature variations during the time periods when the mixing cycles take place, the temperature of the mixture during the mixing cycle can reach approximately 150° C. to 170° C. When the mixture is discharged from the mixer ("mixture drop"), the temperature of the conventional sensor (and in particular the active part of the conventional sensor in contact with the mixture) will start to decrease. However, the time required to return to room temperature is several minutes (at the end of a mixing cycle, the temperature reached by the conventional sensor may be higher than 150° C.). In the case of industrial production, as soon as the discharge of the mixture is completed, the seat of the mixer closes, and new raw materials are introduced to start a new mixing cycle. At this point, the conventional sensor has not returned to room temperature. During the first few seconds of mixing, the temperature measured by the conventional sensor is therefore incorrect.

To remedy this problem, the sensor 10 uses the blowing stem 14 to direct the compressed air continuously to the removable part 16 (being the active part of the sensor 10 in contact with the mixture). This feature of the sensor 10 allows the removable part 16, which contains the thermocouple 18, to cool down very quickly. Thus, when a new mixing cycle starts, the temperature of the removable part 16 is close to that of the raw materials introduced and the first readings are correct.

In the context of monitoring the mixing quality by temperature, the incorrect temperatures returned by the conventional sensor during the first seconds of mixing are problematic. For example, in the field of rubber mixing, a frequently used monitoring mode is a monitoring of the energy communicated to the mixture ("energy"). In effect, energy is the integral of the amplitude under the temperature curve (shown in FIG. 5). In rubber mixing processes, a predetermined viscosity of the compound can be characterized by a reference temperature that corresponds to a characteristic torque of the predetermined viscosity. In predicting the energy to achieve the characteristic torque, the temperature of the mixture must be known as accurately as possible.

By using the sensor 10, the internal mixer also performs rubber mixing with a stable viscosity. Viscosity, also known as "plasticity" and expressed in "Mooney unit" (or "UM" or "Mooney"), characterizes, in a known way, solid substances.

An oscillating consistometer as described in ASTM D1646 standard (1999) is used. This measurement of plasticity is carried out according to the following principle: the sample analyzed in its raw state (that is, before heating) is molded (formed) in a cylindrical enclosure heated to a given temperature (for example, e.g. 35° C. or 100° C.). After one minute of preheating, the rotor rotates within the specimen at 2 revolutions per minute (rpm) and the useful torque to sustain this movement is measured during 4 minutes of rotation. The Mooney viscosity (ML 1+4) which is expressed in UM (with 1 UM=0.83 Nm) corresponds to the value obtained at the end of 4 minutes.

For silica mixtures, monitoring temperature versus time is also important for tracking the progress of the reaction between silica and silane (also called "chemical time"). The time spent above a certain temperature must be recorded in order to determine the progress and therefore the point at which the mixture is compliant. Measuring the temperature as accurately as possible throughout the mixing cycle is essential for the most correct and controlled production of rubber mixtures. The optimum temperature corresponds to an optimal reaction between silica and silane.

A mixing cycle can be made by PLC control and can include pre-programming of operational information. For example, a process setting can be associated with the mixture that is supplied to the mixer, including temperature measurements obtained by the sensor 10 during the mixing cycle. A monitoring system could be set up, at least part of which may be provided in a portable device such as a mobile network device (for example, mobile phone, laptop computer, network-connected portable device(s) (including 'augmented reality' and/or 'virtual reality' devices), network-connected wearable clothing and/or any combinations and/or equivalents).

A mixer incorporating the sensor 10 (and/or a system that incorporates such a mixer) may receive voice commands or other audio data representing, for example, an instantaneous temperature demand measured by the sensor. The request may include a request for the current status of a mixing process cycle and/or the status of the sensor 10 (which indicates whether the removable part 16 is in an operational state). A generated response can be represented audibly, visually, tactilely (for example, using a haptic interface) and/or in a virtual and/or augmented manner.

A mixer incorporating the sensor 10 (or a system that includes such a mixer) can be driven to recognize temperature values of the mixture obtained by the sensor 10 and to make a comparison with target temperature values. This step may include the step of training the mixer to recognize non-equivalences between the values being compared. Each training step includes a classification generated by self-learning means. This classification may include, without limitation, the raw material and/or masterbatch parameters of the selected mixing recipe, rotor configurations, process cycle times and expected temperature values at the end of a progressing cycle (for example, at mixture drop).

To obtain mixtures with the desired properties, the temperature sensor of the invention utilizes the advantages of easy replacement with the benefits of internal cooling. Thus, a single sensor configuration is provided that can measure the temperature of a variety of mixtures regardless of the size of the mixer in which the sensor is incorporated.

The terms "at least one" and "one or more" are used interchangeably. Ranges that are presented as "between a and b" include the values of both "a" and "b".

While specific ways of performing the disclosed device have been illustrated and described, it is understood that various changes, additions and modifications may be made without deviating from the spirit and scope of this presentation. Consequently, no limitations should be imposed on the scope of the invention described except those set forth in the claims annexed hereto.

The invention claimed is:

1. A temperature sensor for measuring a temperature of a mixture being mixed in an internal mixer, the temperature sensor comprising:
    a fixed part in a form of a body that is substantially cylindrical with a predetermined length extending between a measuring end, where the temperature of the mixture is measured by the temperature sensor, and an access end, and with a conduit delimited inside the body incorporating a face towards the measuring end, the conduit having a length substantially equal to the predetermined length of the body;
    a removable part arranged inside the conduit of the body towards the measuring end where it abuts the face of the body, the removable part having a predetermined length extending between a clamping end, where the removable part is clamped with respect to the fixed part, and a contact end, where the removable part comes into contact with the mixture, the removable part having a shoulder defined at the clamping end that engages the face of the body, and the removable part having a conduit of a predetermined length within the removable part that is defined by a distance between the shoulder and the contact end, the removable part incorporating a temperature measuring element or elements arranged inside the conduit of the removable part at the contact end; and
    a blowing stem in communication with a source of compressed air that extends along the conduit of the body from the access end, wherein the blowing stem enters the body, and terminates at an outlet end arranged in the conduit of the removable part so that the compressed air exits the blowing stem and passes uninterruptedly by the temperature measuring element or elements at the contact end.

2. The temperature sensor of claim 1, wherein the temperature measuring element comprises one or more thermocouples.

3. The temperature sensor of claim 1, wherein the removable part has a domed shape.

4. The temperature sensor of claim 1, wherein the removable part further comprises a flattened part defined at the clamping end; and
    the fixed part comprises a needle screw arranged towards the measuring end of the body, such that tightening of the needle screw of the body on the flattened part prevents rotation of the removable part when an assembly of the removable part and the fixed part is effected.

5. The temperature sensor of claim 4, wherein the blowing stem enters the removable part at the clamping end, where the engagement between the needle screw and the flattened part prevents rotation of the removable part.

6. The temperature sensor of claim 1, further comprising a protective tube with a predetermined length extending between an arrangement end, wherein the protective tube engages the shoulder of the removable part, and a screwing end, wherein the protective tube is held by a part that is screwed with the body and presses against the protective tube to retain the removable part in an operative position in the conduit of the body.

7. The temperature sensor of claim 6, in which the blowing stem is protected by the protection tube to provide an uninterrupted air flow from the source of compressed air to the outlet end of the blowing stem.

8. The temperature sensor of claim 7, wherein a selected material for the body and the removable part comprises stainless steel.

9. An assembly of an internal mixer and a temperature sensor for measuring a temperature of a mixture being mixed in the internal mixer, the assembly comprising:
an internal mixer that makes rubber mixtures and includes a ram and two half-chambers, each containing a rotor with one or more blades that rotate relative to a wall of a corresponding half-chamber; and
the temperature sensor of claim 1, the temperature sensor being mounted with respect to the internal mixer in such a way that the contact end of the removable part remains sufficiently free to allow good reactivity in the measurement of temperature while remaining uninfluenced by bending stresses associated with the mixture.

10. A kit comprising:
the temperature sensor of claim 1; and
mounting means adapted for mounting the temperature sensor with respect to a selected internal mixer.

* * * * *